Aug. 7, 1934.  J. D. ACUFF  1,969,634

TURNTABLE

Filed April 25, 1932  3 Sheets-Sheet 1

Inventor
J. D. Acuff

Attorneys

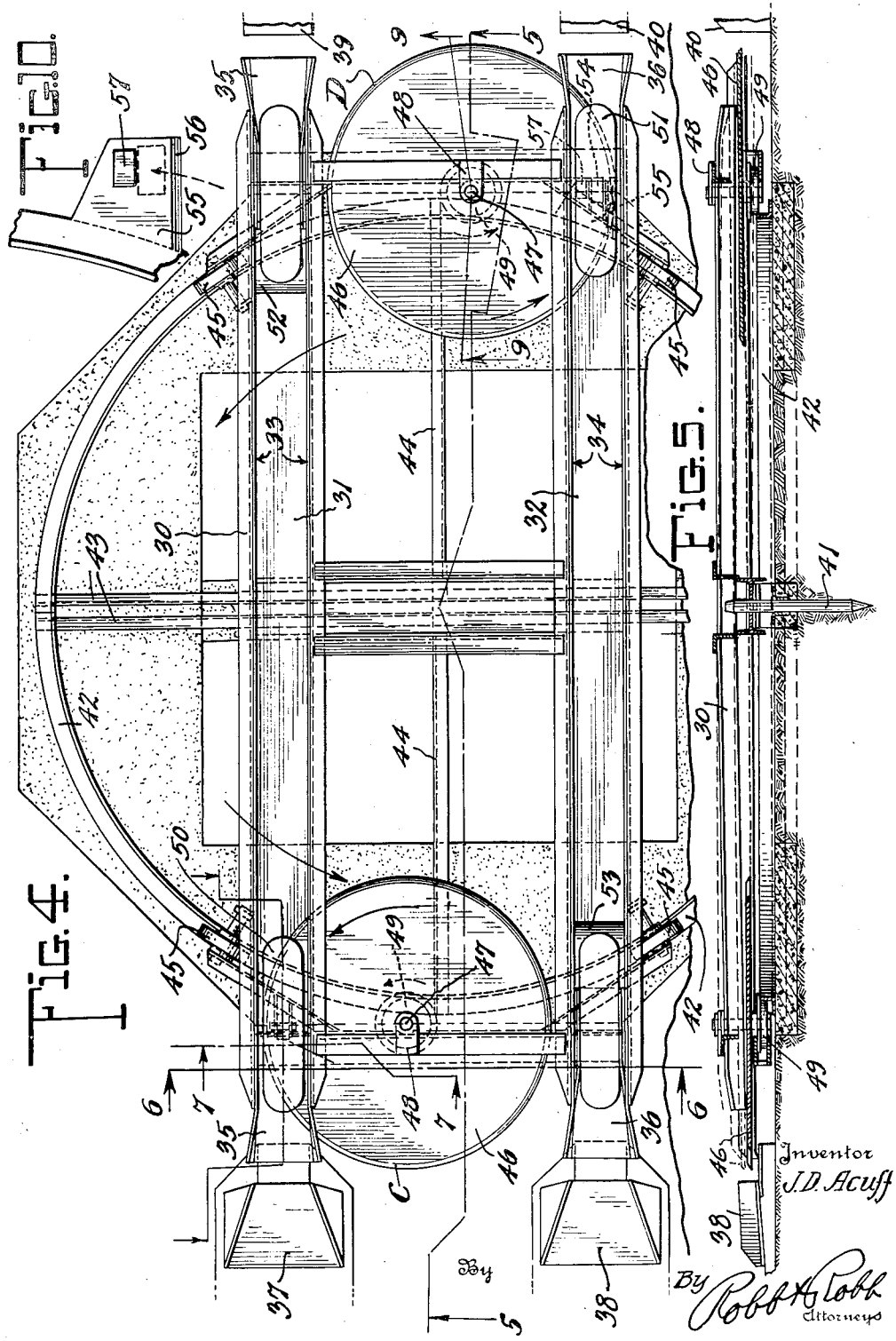

Aug. 7, 1934.  J. D. ACUFF  1,969,634
TURNTABLE
Filed April 25, 1932    3 Sheets-Sheet 3
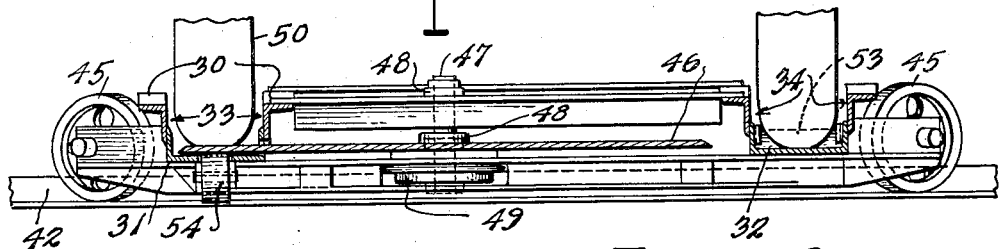
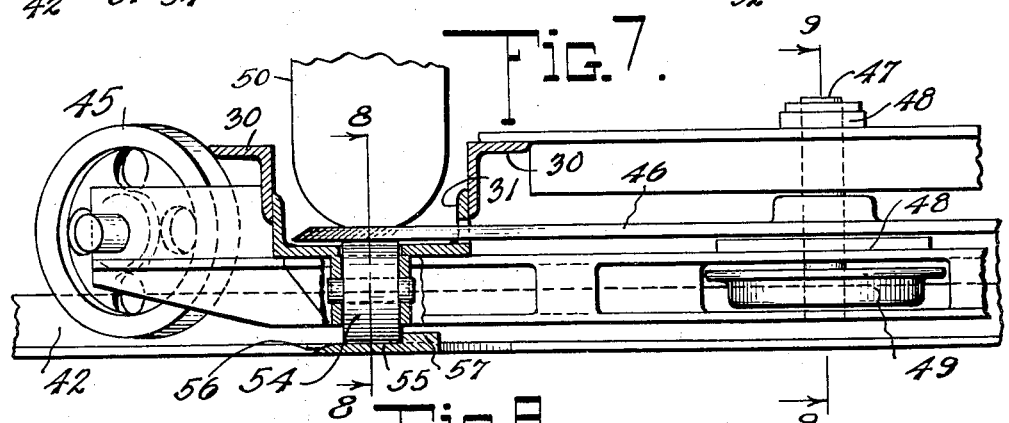
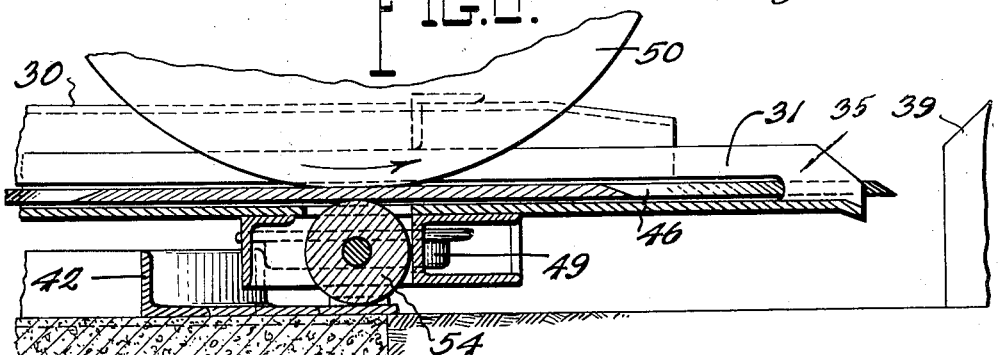
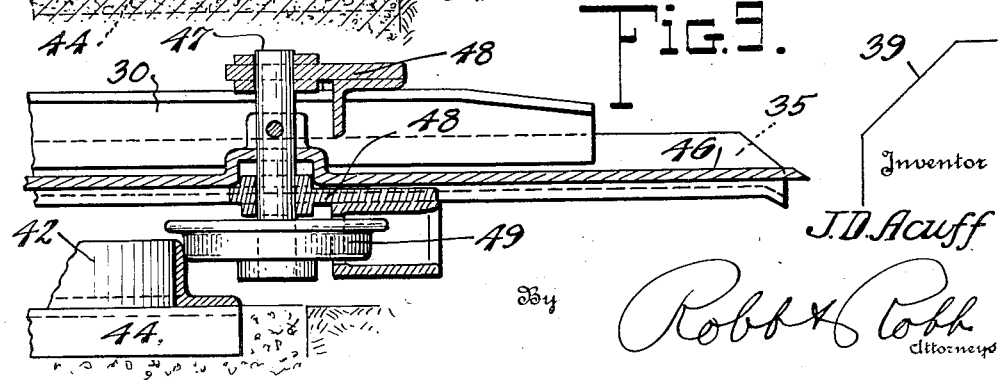
Inventor
J. D. Acuff
By Robb & Robb
Attorneys Patented Aug. 7, 1934

1,969,634

UNITED STATES PATENT OFFICE 1,969,634

TURNTABLE

James D. Acuff, Jasper, Ala.

Application April 25, 1932, Serial No. 607,435

6 Claims. (Cl. 104—41)

This invention relates to a turn-table construction wherein the primary object resides in the elimination of a special power source such as is customarily employed, yet which is nevertheless of the power-operated type. Such a construction is especially adapted for use as a turn-table for motor vehicles such as automobiles or other vehicles having a source of power carried thereby or directly associated therewith, said source of power of the vehicle being utilized as the motivating power for operation of the turn-table through the medium of apparatus to be hereinafter more fully described.

The uses to which the invention may be put are numerous. In commercial parking and/or repair garages where the space for turning or manipulating the vehicles is necessarily limited, my invention fulfills a long-felt want. Heretofore, it has been impracticable to employ a turn-table for such places owing to the heavy expense involved, which is primarily due to the necessity for providing separate directly connected power units for the turn-tables of the types known up to the present time. As far as I am aware, I am the first to produce a practical turn-table construction wherein the power of the vehicle manipulated thereby is utilized for rotating the turn-table thus eliminating considerable apparatus heretofore required. By such elimination, the expense of manufacture and initial cost to the user is reduced to a minimum. The cost of operation is also dispensed with and the maintenance negligent. In fact, the apparatus may be manufactured at such a low cost that it is entirely feasible and greatly desirable for private garages, that is, small garages generally associated with private residences.

In many instances it is necessary in driving an automobile out of the usual private garage to back the car in reverse gear into an alley or down a long driveway into the street. This involves considerable danger owing to the inability of the operator to readily see approaching traffic as his vehicle moves into the alley or street. In addition, many drivers cannot manipulate the vehicle as well in reverse as in forward gear, their difficulties being further increased where the course from the garage to the alley or street is not straight. Thus, in driving the vehicle from the garage in a forward direction, the operator generally has the vehicle under better control and the danger incident to entering a thoroughfare is reduced to a minimum by virtue of the fact that the driver is better able to observe traffic on the thoroughfare.

To this end, my invention provides a simple and inexpensive means for shifting or reversing the position of motor vehicles and the like, and is excellently adapted for universal adoption by coming within the means of the average private automobile owner as well as the commercial garage operator, gasoline station proprietor, and others who are greatly concerned with space restrictions and the elimination of waste space. It is quite apparent that in public parking garages, down-town parking lots or the like the space generally required to be left free for the maneuvering and shifting of the vehicle yields no returns and may therefore be termed dead or waste space. By employing one or more of my turn-tables the amount of this dead or waste space may be considerably reduced, thereby increasing the net returns, the outlay for the turn-tables being slight.

With slight modifications in construction which will be readily apparent to one skilled in the art, my turn-table may be used for a railroad turn-table wherein the power of the locomotive is utilized to actuate the turn-table, in lieu of the turn-tables employing separate power mechanism for the actuation thereof as are now in general use.

A further object of the invention is the provision of a turn-table of the type above referred to, wherein the power of the vehicle adapted to be manipulated by the turn-table is utilized to actuate the turn-table, which is automatically reconditioned for the reception of successive vehicles.

A still further object of the invention is the provision of automatic stop means for the turn-table, said stop means being preferably adjustable.

Another object of the invention is the provision of mechanism automatically operable by the traction wheels or members of the vehicle incident to the driving of the vehicle onto the turn-table and the attainment of its manipulation position thereon, for actuating the turn-table.

It is also within the purview of the invention to provide a platform or frame rotatably mounted on a suitable foundation track, the platform or frame carrying suitable rollers or disks operatively associated with the track and engageable by one or more traction members of the vehicle to be manipulated by the turn-table for rotating the turn-table from the power source of the vehicle.

It is further contemplated by the invention to employ a plurality of roller or disk units suitably located on the platform or frame of the turn-table so as to recondition the turn-table for the reception of successive vehicles without necessitating the reversal of the turn-table after the manipulation of each vehicle. These turn-table actuating units are preferably arranged so that certain units are automatically rendered inoperative and others operative upon the positioning of the vehicle on the turn-table, the inoperative and operative units being subsequently rendered operative and inoperative respectively upon the positioning of the next successive vehicle on the turn-table.

The invention still further contemplates the complete or partial reversal of a vehicle by the turn-table by a continuous and uninterrupted operation; that is to say, upon driving the vehicle onto the turn-table the turn-table is automatically set into operation without the necessity of shifting gears, applying brakes, or performing any other operation with respect to either the vehicle or turn-table and likewise, upon reaching the desired position, the turn-table is automatically stopped and the vehicle moves off without any changing of gears, applying of brakes, or other operation, all of which may be and is preferably preformed with the vehicle set in forward gear as when driven onto the turn-table in a forward direction.

Other and further objects of the invention will be hereinafter set forth and the novel features thereof defined by the appended claims.

In the drawings:

Fig. 4 is a top plan view of another form of my invention, a portion thereof being broken away;

Fig. 5 is a vertical sectional view taken approximately on line 5—5 of Fig. 4;

Fig. 6 is an enlarged, detail vertical sectional view taken approximately on the line 6—6 of Fig. 4;

Fig. 7 is an enlarged, detail vertical sectional view taken approximately on line 7—7 of Fig. 4, certain of the parts being shown in elevation;

Fig. 8 is an enlarged, detail, vertical sectional view taken approximately on the line 8—8 of Fig. 7;

Fig. 9 is an enlarged, detail vertical sectional view taken approximately on the line 9—9 of Fig. 7; and Fig. 10 is a fragmentary, detail view of one form of the automatic stop.

Like reference characters denote corresponding parts in the several figures of the drawings.

Figure 1:
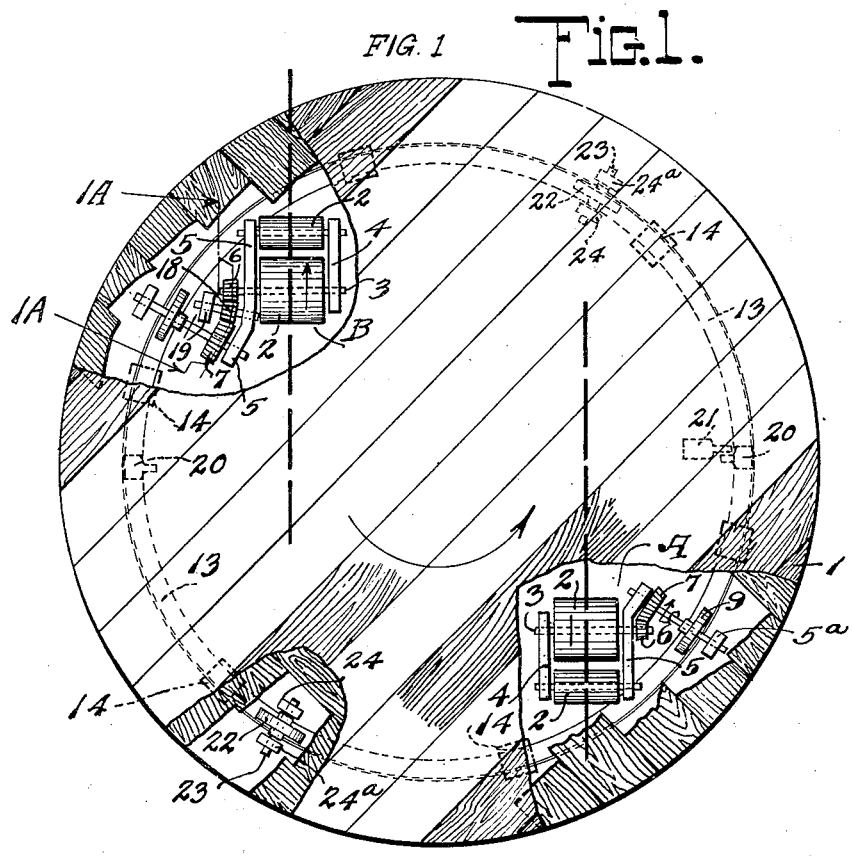
Fig. 1 is a top plan view of one form of my invention, portions of the turn-table platform being broken away for the sake of clearness.
Figure 2:
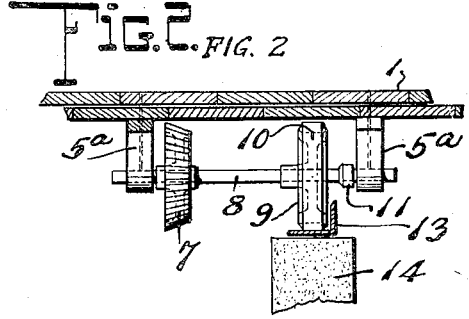
Fig. 2 is a fragmentary, detail sectional view showing one of the turn-table drive members cooperating with the track.
Figure 3:
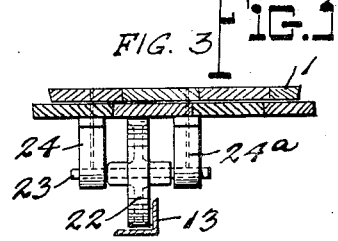
Fig. 3 is a fragmentary, detail sectional view showing one of the turn-table guide or stabilizing members.
Figure 1A:
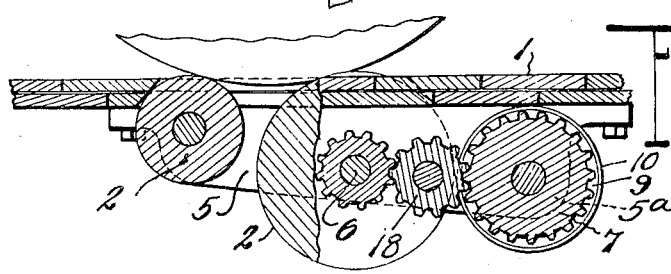
Fig. 1A is a fragmentary, detail sectional view taken approximately on the line 1A—1A of Fig. 1.

Referring first to Figs. 1 to 3, inclusive, there is illustrated one of the most simple and inexpensive forms of my invention, wherein 1 is the turn-table platform perfectly circular in shape and formed of wood or other suitable material. When made of wood, two or more layers are preferably employed, the individual boards forming each layer being laid at right angles to the boards of the adjacent layer, the layers being suitably secured together in any desired manner and providing a rigid construction. Drive rollers 2, constituting power transmission means for actuating the turn-table are provided, said drive rollers being in the form of units A and B, each unit being composed of two rollers rotatably mounted in suitable journal boxes or brackets 4 and 5. The rollers may be made of wood, metal or other suitable material, wood of course, being perhaps the least expensive material. The size and length of the rollers may be varied if desired. One of the rollers of each unit is preferably larger in diameter than the other, this larger roller constituting the actuating or power transmission roller, and being secured on a shaft 3 to which is fixed a bevel pinion 6. In unit A, bevel pinion 6 meshes with another beveled gear 7 fixed to a shaft 8 journaled at one end in bracket 5 and at the other in bracket 5a. A drive roller 9 is suitably fixed to shaft 8 intermediate the brackets to cooperate with a track 13 on which the platform 1 is rotatably mounted, the track being preferably circular in formation and having a horizontal flange for supporting the platform and a vertical guide flange. The drive roller 9 is preferably provided with a frictional material such as a rubber tire 10 or the like for insuring a positive driving relation between the roller 9 and the track. A suitable set collar 11 is preferably provided on roller 9 to secure the same in proper position on shaft 8 so that it registers with the horizontal flange of the track. The size of the track may be varied to suit the requirements of each individual use, the turn-table platform being generally made of a sufficient size to accommodate the longest vehicle which would have to be handled. Suitable guide or stabilizing rollers 22 mounted on shafts 23 rotatably carried in brackets 24 and 24a, fixed to the underside of the turn-table platform, are provided. In Fig. 1, two stabilized rollers have been shown located intermediate driving assemblies A and B. It is to be understood, however, that the number of such rollers may be varied as desired.

The track 13 is mounted on any suitable foundation such as concrete piers 14 or the like as shown in Fig. 2, the vertical guide flange cooperating with the stabilizing rollers 22 and drive rollers 9 to maintain the turn-table platform centralized with respect to the track.

The drive rollers 2 are so arranged in the brackets 4 and 5 that their upper surfaces are preferably at the same elevation, the rollers projecting through a suitable aperture in the platform slightly above the upper surface of the platform. The position of the rollers is such that they will engage one of the traction wheels of the vehicle when driven onto the platform, the traction wheel automatically coming to rest in the pocket or depression formed by the spacing of the rollers. It is unnecessary to provide a separate set of rollers and mechanism for each traction wheel, since the differential mechanism on the usual motor vehicle permits transmission of power through one traction wheel when the other wheel is held stationary. Thus, in driving the vehicle onto the platform with the wheels following the path indicated by the dashed lines in Fig. 1, one of the rear wheels of the vehicle would rest on the rollers 2 of unit A and the other rear wheel would be held stationary resting on the platform. If desired, however, a separate unit, which would be a duplication of unit A might be provided for cooperation with the other traction wheel of the vehicle for simultaneous operation with unit A, but this duplication is unnecessary and would increase the cost of the turn-table construction.

A separate unit B is provided on the platform at the opposite end from unit A, this unit being substantially a duplicate of unit A with the exception that there is provided an idler or reverse gear 18 mounted intermediate bevel gears 6 and 7, said idler gear being mounted on a shaft journaled in brackets 5 and 19 fixed to the lower side of the platform. It will thus be seen that the motion imparted to the platform by unit A will be in a counter-clockwise direction, whereas the motion imparted by unit B will be in a clockwise direction, the rollers in each instance being rotated in a direction such as would be imparted by the traction wheel of a vehicle when driven thereon.

Suitable stop members are preferably provided to automatically interrupt the rotation of the turn-table at a predetermined point. Stop blocks 20 fixed to the track at the desired positions in which the platform rotation is to be interrupted, cooperate with a stop block 21 fixed to the lower side of the platform. This arrangement may be such that the position of the stop blocks may be varied if desired. As shown in Fig. 1, the position of the stop block is such that rotation of the platform is restricted to a half-revolution in each direction—that is, unit A, cooperating with the vehicle traction wheel rotates the platform a half-revolution in a counter-clockwise direction, and unit B cooperating with the traction wheel of the next successive vehicle rotates the platform a half-revolution in a clockwise direction.

More specifically referring to the operation of the turn-table shown in Figs. 1 to 3, assuming a vehicle has driven onto the platform so that the right hand rear wheel is positioned on the rollers 2 of unit A, the unit is automatically set into operation without the necessity of shifting gears or performing any operation to condition the turn-table for rotation, the turn-table being set into motion in a counter-clockwise direction immediately upon the reaching of the traction wheel at a position in the pocket formed by the spaced rollers. The motive power of the vehicle is thus automatically transposed to a motive power for the turn-table through the intermediary of the vehicle traction wheel, the drive rollers 2, the gears 6, 7 and the roller 9 cooperating with track 13. As soon as the stop block 21 fixed to the platform engages stop block 20 at the end of the half revolution of the platform in a counter-clockwise direction, further rotation of the platform and also the rollers 2 is thus prevented. Since the rollers 2 cannot rotate further, the vehicle will automatically move off the platform without shifting gears or performing any operation. The platform will now be in a reversed position wherein unit B will be now disposed in the same position corresponding to that of unit A as shown in Fig. 1. The turn-table is thus reconditioned for the reception of a successive vehicle, which, when driven onto the platform, with the traction wheel in position on the rollers 2 of unit B will rotate the platform in the opposite direction and automatically displace the vehicle when the stop block 21 reaches the position shown in Fig. 1.

Referring now to the form of the invention illustrated in Figs. 4 to 10, 30 designates generally a frame constituting the turn-table platform. This frame preferably has the form of suitably spaced channels 31 and 32 having vertical side flanges 33 and 34 for the reception of the vehicle wheels therebetween. At each end of the channels there are preferably provided flared guide members 35 and 36 for facilitating the entrance of the vehicle wheels in the channels 31 and 32 of the frame 30. The guide members centralize the wheels in the channels. Suitable ramps 37 and 38 are formed at one end of the turn-table to facilitate the driving of the vehicles onto and off of the turn-table frame. At the opposite end of the turn-table, safety stop members or abutments 39 and 40 are provided. The frame 30 is pivotally mounted on a fixed pivot 41 set in concrete or otherwise rigidly fixed to the turn-table foundation, suitable means being provided for maintaining the frame in a slightly elevated position above the foundation to permit tilting the frame. A suitable track 42, angular in form to provide a horizontal supporting flange and a vertical guide flange, is employed in conjunction with the fixed pivot 41 for rotatably mounting the turn-table frame 30. This track has been shown in the drawings as being formed in two semi-circular sections 42, each of which is provided with angular cross pieces or braces 43 fixedly secured to the lower side of the track sections and securing the opposite ends of the semi-circular sections together. Intermediate braces 44 are also provided, the braces 43 and 44 being preferably set in concrete or other suitable material for providing a firm and rigid foundation. One of the ways in which such a foundation may be constructed is to dig a polygonal channel slightly larger in size than the track 42, and cross channels corresponding to the positions of the cross pieces or braces 43 and 44, concrete being poured in these channels and leveled off to provide a level foundation for the track, the cross pieces being embedded in the concrete to firmly hold the track in position on the foundation.

Fixed to the frame 30 in any suitable manner, and rotatably mounted beneath the same are idler or stabilizer rollers 45, these rollers cooperating with the track to limit the downward movement of the turn-table frame and support the weight as will be more fully described hereinafter. Also mounted on the frame 30 beneath the same are the driving units C and D, said driving units comprising disks 46 rigidly mounted on vertical shafts 47, which shafts are journaled in suitable bearings 48 fixed to the turn-table frame. Fixedly mounted on shafts 47 are drive rollers 49 positioned for engagement with the vertical flange of the track 42 to establish driving relation between the disks 46 and the track to rotate the turn-table frame. Suitable apertures 50 and 51 are provided in channels 31 and 32 respectively of the turn-table frame to enable a traction wheel of a vehicle when driven onto the frame to engage the disks and establish a driving connection with the vehicle motor. The frame is of a sufficient length to accommodate the vehicles having a long wheel base, the shorter vehicles being also equally accommodated. To insure stopping of the vehicle on the turn-table frame in such a position that a traction wheel engages the disk of the units C and D, the channels 31 and 32 may be provided respectively with a hump or raised portion 52 and 53. The same result may be accomplished by forming the channels with slight depressions therein.

Suitable stop means for interrupting the rotation of the turn-table frame at a predetermined point are provided and will now be specifically described. Carried by the frame beneath the driving disks 46 are roller members 54 rotatably journalled on the frame in engagement with the lower faces of the disks. These roller members are best shown in Figs. 6 to 8. Located in the path of these roller members and positioned at a point so as to interrupt the rotation of the turn-table frame at the desired point, is a plate member 55 in the form of a cam, one edge of the plate being bevelled as at 56 so as to cause the roller member to ride up the edge and onto the plate, the turn-table frame being tilted slightly to clamp the roller member between the disk 46 and the plate, and thus prevent further rotation of the disk by the vehicle traction wheel. An abutment member 57 mounted on the plate insures the stopping of the turn-table platform at the desired point by engagement with one side of the roller member as it moves onto the plate. Interruption of rotation of the disk thus prevents further rotation of the turn-table frame and automatically causes displacement of the vehicle from the frame.

As hereinbefore stated, in this form of the invention, the drive units are located at opposite ends of the turn-table frame, one drive unit being actuated by the vehicle when driven onto the frame for manipulation of the vehicle, after which manipulation, the other drive unit is in position for actuation by the successive vehicle. In this form, the drive units are so arranged as to rotate the turn-table frame in the same direction, a counter-clockwise direction as shown. The tilting feature of the platform which will now be more fully described in the brief résumé of the operation permitting this continuous rotation or rotation in the same direction.

To actuate the turntable, the vehicle is placed in gear, and driven up the ramps 37 and 38 onto the turntable frame 30, preferably in a forward direction of motion of the vehicle, the guides 35, 36 centralizing the vehicle wheels in the channels 33, 34 so as to locate one of the traction wheels on the disk C when in the position shown in Fig. 4, and directly over the roller member 54. The hump 53, or depression, as it may be, facilitates the stopping of the vehicle with the traction wheel in the proper position on the disk. In the usual type of motor vehicle, the rear end of the vehicle is the heavier, and this unequal weight of the vehicle at its ends causes a tilting of the turn-table frame on its pivot 41, thereby bringing the drive roller 49 of unit C into engagement with the vertical flange of the track 42, as shown in Fig. 9, thus placing the parts in position for rotation of the turn-table frame as shown best in Figs. 5 and 9. The normal balanced position of the turn-table frame is shown in dotted lines in Fig. 5. As soon as the vehicle reaches the position above referred to with the traction wheel in engagement with the disk 46 of unit C, the motive power of the vehicle is automatically transposed by rotation of the disk 46 and drive roller 49 by the traction wheel of the vehicle to a motive power for the turn-table frame. The frame is thence rotated in a counter-clockwise direction until the roller member 54 reaches the cam plate 55 associated with the track 42, preferably in an adjustable manner, whereupon the roller member 54 rides up the bevelled edge 56 of the cam plate and brings the turn-table frame to a stop upon engaging the abutment 57 on the cam plate. As the roller member 54 rides up the bevelled edge 56, the turn-table frame is tilted about its pivot 41 so as to raise the stabilizer rollers 45, adjacent unit C, off of the track, the weight of the vehicle thus being assumed by the roller member 54 resting on the cam plate. In this position as shown best in Fig. 7, the roller member 54 prevents further rotation of the disk 46 and the vehicle is thereby automatically caused to be displaced from the turn-table frame in a forward direction under its own power, the said power being automatically transposed from a motivating power for the turn-table to a motivating power for the vehicle. The turn-table frame will now be in a position displaced 180° from that shown in Fig. 4 of the drawings, with drive units C located in the position in which the drive unit D is shown and vice versa. Upon driving the next successive vehicle onto the turn-table frame into such a position that one of the traction wheels engages disk 46 of the drive unit D, the heavier weight of the vehicle at its rear end causes a tilting of the turn-table frame so that roller member 54 of drive unit C will be raised off of cam plate 55 and to such an elevation that it will pass over the abutment 57 when disk 46 of drive unit D is actuated by the traction wheel to further rotate the turn-table frame. By this arrangement, the turn-table frame may be always rotated in the same direction, the drive means being reconditioned for actuation of the turn-table frame by the positioning of successive vehicles thereon.

It is to be understood that the principle of operation is the same in both forms of the invention shown, the operation of reversing or partly reversing the position of the vehicle when placed on the turn-table being a continuous one, thereby eliminating the necessity of the driver leaving the vehicle to condition the turn-table for operation, or of shifting gears or performing any other operation. Likewise, it is unnecessary to duplicate the drive units shown in the form of the invention illustrated in Figs. 4 to 10 so as to provide a drive unit for each traction wheel, the differential of the motor vehicle permitting actuation of a single drive unit for rotating the turn table by one traction wheel, with the other traction wheel held stationary. The length of the vehicle is immaterial so long as the turn-table platform or frame is sufficiently long to receive the vehicle thereon. When one of the traction wheels is in cooperating position with one of the drive units, the relative position of the front wheels of the vehicle with respect to the other drive unit is immaterial.

In both forms of the invention illustrated, the drive between the turn-table platform or frame and the track is of the friction type, and drive rollers 49 of units C and D may also have their track engaging surfaces provided with some material having a high co-efficient of friction such as rubber, composition or the like, as in the simpler form of the invention of Figs. 1 to 3. It is to be understood however, that a positive drive might be substituted for a friction drive if desired, such as by providing a toothed track or ring gear in place of the tracks shown and a cooperating pinion in place of the drive rollers 9 and 49. This would in all probability increase the cost of the construction. For general purposes the friction drive is satisfactory.

While in one form of the invention there has been shown a platform which constitutes the turn-table and in the other form a frame formed of metal, it is to be understood that the driving units associated with these respective turn-table forms might be employed in either construction and is not restricted to the specific form with which it is illustrated. That is to say, the turntable of the circular platform type might be provided with the disk type driving units and associated mechanism cooperating therewith and likewise the skeleton frame type turn table might be provided with the roller type drive units. Also, suitable means may be provided if desired, for adjusting the positions of the stop members to permit interruption of rotation of the turn-table at any desired point. Such means have not been illustrated, but will readily present themselves to one skilled in the art.

While the specific types of construction have been herein shown and described, the invention is not confined thereto and changes and alterations may be made therein without departing from the spirit thereof as defined by the appended claims.

What I claim is:

1. The combination with a turn-table apparatus and operating mechanism therefor, including a driving disk carried by the turn table, of a motor vehicle, and means for establishing operative connection between the motor vehicle and the turn-table operating mechanism by engagement of one of said vehicle wheels with said driving disk for operating the turn-table from the power of the vehicle.

2. In a vehicle operated device of the class described, the combination of a turn-table, friction drive means for turning the same by a motor driven vehicle adapted to actuate the turn-table when said vehicle is disposed thereon, means establishing actuating relation between the vehicle and the turning means aforesaid, said means being so arranged as to automatically and uninterruptedly transpose the motive power of the vehicle to a motive power for the turn-table, and means for automatically increasing the frictional resistance offered to the drive means whereby to interrupt the turning movement of the turn-table at a predetermined point and simultaneously, automatically and uninterruptedly re-transpose said turn-table motive power to a motive power for the vehicle effecting displacement of the vehicle therefrom under the control of the vehicle motor.

3. In motor vehicle operated apparatus of the class described, a frame constituting a turn-table, said frame including a pair of spaced vehicle wheel receiving channels, a track on which said frame is rotatably mounted, a central pivot about which said frame is rotatable, guide rollers carried by said frame and cooperating with said track, a drive roller carried by one end of said frame and engageable with said track, a drive disk rotatably carried by said frame within the same and cooperating with said drive roller for rotating said frame by the rotation of a traction wheel of a motor vehicle when driven thereon into a position with the traction wheel engaging said disk, said frame having an opening therein for permitting engagement of the traction wheel with said disk, and being tiltable by the weight of the vehicle to bring said drive roller into driving engagement with said track incident to such positioning of the vehicle on the frame with the traction wheel in driving engagement with the said disk, and stop means for interrupting rotation of said disk and of said frame at a predetermined point and simultaneously effecting displacement of the vehicle from the frame under the control of its motor.

4. In motor vehicle operated apparatus of the class described, a frame constituting a turn-table, said frame including a pair of spaced vehicle wheel receiving channels, a track on which said frame is rotatably mounted, a central pivot about which said frame is rotatable, guide rollers carried by said frame and cooperating with said track, a drive roller carried by one end of said frame and engageable with said track, a drive disk rotatably carried by said frame within the same and cooperating with said drive roller for rotating said frame by the rotation of a traction wheel of a motor vehicle when driven thereon into a position with the traction wheel engaging said disk, said frame having an opening therein for permitting engagement of the traction wheel with said disk, and being tiltable by the weight of the vehicle to bring said drive roller into driving engagement with said track incident to such positioning of the vehicle on the frame with the traction wheel in driving engagement with the said track, and stop means for interrupting rotation of said disk and of said frame at a predetermined point, and simultaneously effecting displacement of the vehicle from the frame under the control of its motor, said stop means comprising a roller member carried by said frame beneath said drive disk in cooperative relation to the latter, a cam plate having an inclined portion arranged to be engaged by said roller member to prevent further rotation of the drive disk by the vehicle traction wheel, and an abutment cooperating with the said roller member, to arrest the rotation of the frame, said stop means being releasable by the weight of successive vehicles.

5. In a motor vehicle operated apparatus of the class described, a frame constituting a turn-table, said frame including a pair of spaced vehicle wheel receiving channels, a track on which said frame is rotatably mounted, a central pivot on which said frame is normally balanced and about which it is rotatable, guide rollers carried by said frame cooperating with said track, a drive roller carried by each end of said frame and engageable with said track, a drive disk carried by said frame at each end of the same and respectively cooperating with said drive rollers for rotating said frame by the rotation of a traction wheel of a motor vehicle when driven thereon into a position with the traction wheel engaging one of said disks, said frame having openings therein for permitting engagement of the traction wheel with said disks and being tiltable on its pivot by the weight of the vehicle to bring one of said drive rollers into driving engagement with said track incident to such positioning of the vehicle on the frame with the traction wheel in driving engagement with one of said disks, stop means for interrupting rotation of said disks and of said frame at a predetermined point and simultaneously effecting displacement of the vehicle from the frame under the control of its motor, said stop means comprising a roller member carried by each end of said frame respectively beneath the said drive disks in cooperative relation to the latter, a cam plate having an inclined portion adapted to be engaged by said roller members to prevent further rotation of the respective drive disk by the vehicle traction wheel, and an abutment cooperating with said roller members to arrest the rotation of the frame, release of said roller members from said abutment being effected by the weight of successive vehicles.

6. A turn-table for motor vehicles comprising a rotatable member, a pivotal mounting therefor, a track with which said rotatable member cooperates, said rotatable member being tiltable on its pivotal mounting, and stop means for interrupting the rotation of said rotatable member at a predetermined point, said stop means being so arranged as to be initially rendered inoperative by a tilting of the rotatable member by the weight of the vehicle when positioned thereon.

JAMES D. ACUFF.